United States Patent [19]
Crevits et al.

[11] Patent Number: 5,557,660
[45] Date of Patent: Sep. 17, 1996

[54] PROGRAM-CONTROLLED COMMUNICATION SYSTEM WHEREBY A CALL REQUEST IS SIMULTANEOUSLY SIGNALED AT A PLURALITY OF COMMUNICATION TERMINAL EQUIPMENT

[75] Inventors: Luc Crevits, Tielt; Marc Vanlandeghem, Deinze, both of Belgium

[73] Assignee: Siemens Aktiengesellschaft, Munich, Germany

[21] Appl. No.: 584,912

[22] Filed: Jan. 11, 1996

Related U.S. Application Data

[63] Continuation of Ser. No. 954,874, Sep. 30, 1992, abandoned.

[30] Foreign Application Priority Data

Sep. 30, 1991 [DE] Germany ............... 41 32 588.5

[51] Int. Cl.$^6$ ................................................ H04M 3/42
[52] U.S. Cl. ................... 379/215; 379/211; 379/212; 379/201; 370/62
[58] Field of Search ............... 379/215, 201, 379/211, 212; 370/62

[56] References Cited

U.S. PATENT DOCUMENTS

| | | | |
|---|---|---|---|
| 4,570,035 | 2/1986 | Pinede et al. | 379/164 |
| 4,905,274 | 2/1990 | Cooper et al. | 379/157 |
| 4,947,421 | 8/1990 | Toy et al. | 379/67 |
| 5,023,868 | 6/1991 | Davidson et al. | 370/62 |
| 5,206,901 | 4/1993 | Harlow et al. | 379/211 |
| 5,315,646 | 5/1994 | Babson, III et al. | 379/201 |
| 5,365,582 | 11/1994 | Yamada et al. | 379/265 |
| 5,432,846 | 7/1995 | Norio | 379/266 |
| 5,461,666 | 10/1995 | McMahan et al. | 379/67 |

*Primary Examiner*—William M. Treat
*Assistant Examiner*—Kenneth R. Coulter
*Attorney, Agent, or Firm*—Hill, Steadman & Simpson

[57] ABSTRACT

Program-controlled communication system, whereby a call request is simultaneously signaled at a plurality of communication terminal equipment. The call request that is addressed to a specific terminal equipment (KE-D) is simultaneously signaled at at least one further terminal equipment (KE-C). These terminal equipment preferably belong to a group of terminal equipment integrated in the communication system which have key functions. When the call is accepted by a terminal equipment (KE-C), then, after the set up of a connection to the other terminal equipment, a connection can be automatically set up between this terminal equipment and the originally calling terminal equipment (KE-A) by actuating a special key (ST). Simultaneously, the call set up between the two first-cited terminal equipment is cleared down. This through-connect of the call to the calling terminal equipment (KE-A) is possible in the same way when this terminal equipment in turn had placed a further terminal equipment (KE-B) with which it previously had a call connection into the hold status. Since, for the connection between the allocated terminal equipment, a call register independent of the other connections is written and read, these call registers must accept information that refer to at most three terminal equipment. Despite the possible participation of a total of four terminal equipment, no involved procedures for the administration of the entries need be provided due to changing switching-oriented statuses for the terminal equipment. Function executions are possible whose ultimate result corresponds to that of a second consultation.

17 Claims, 5 Drawing Sheets

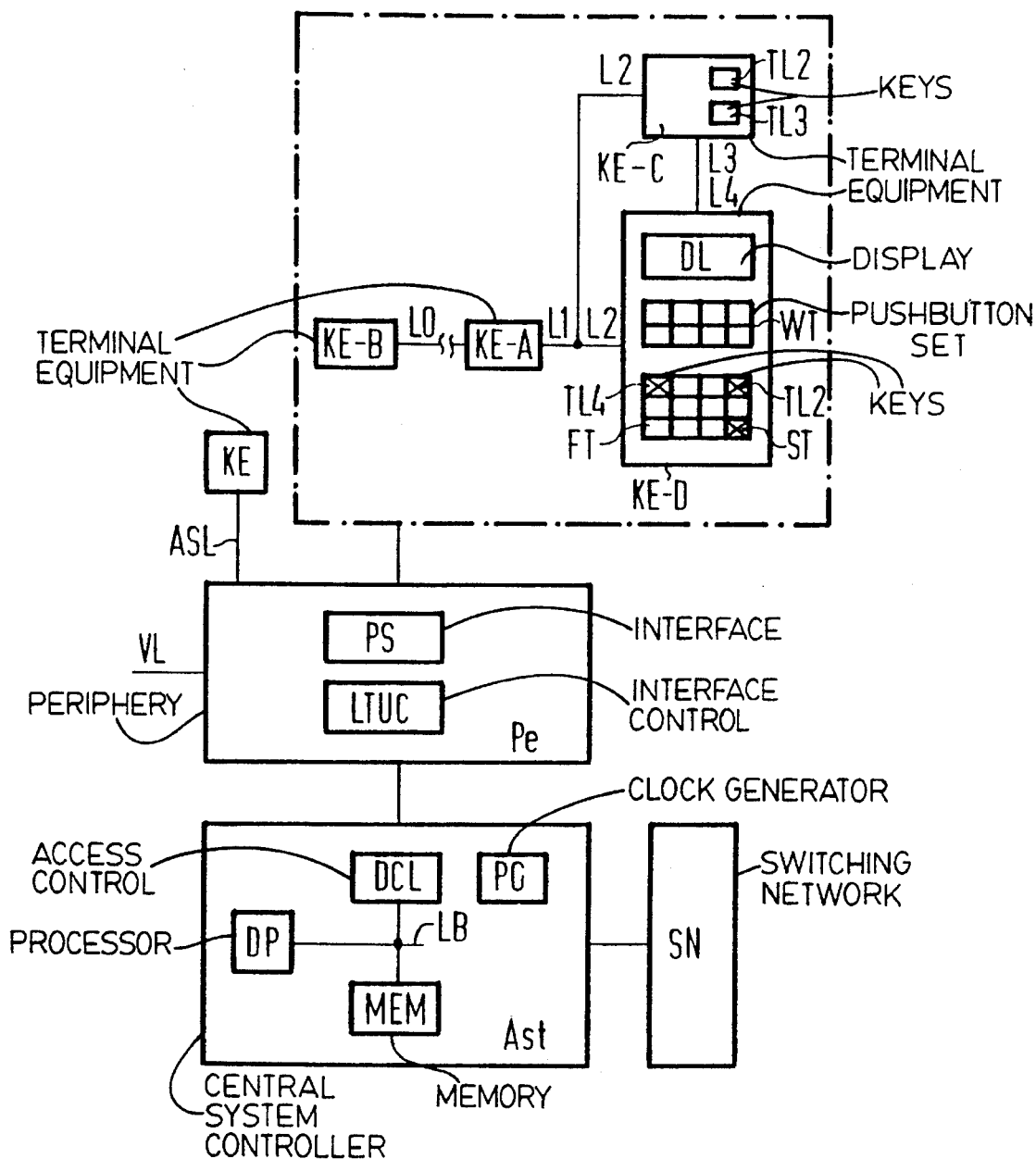

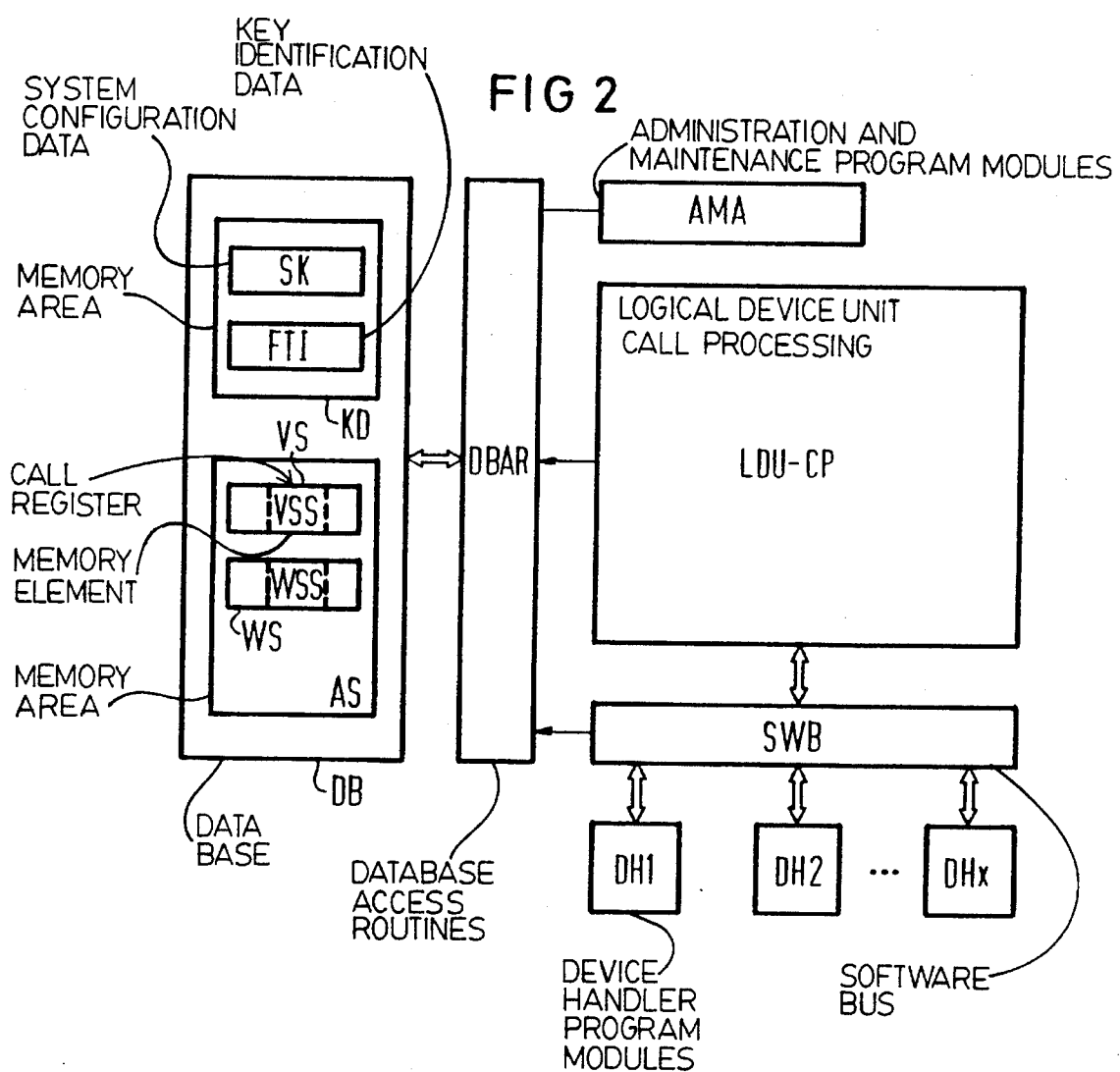

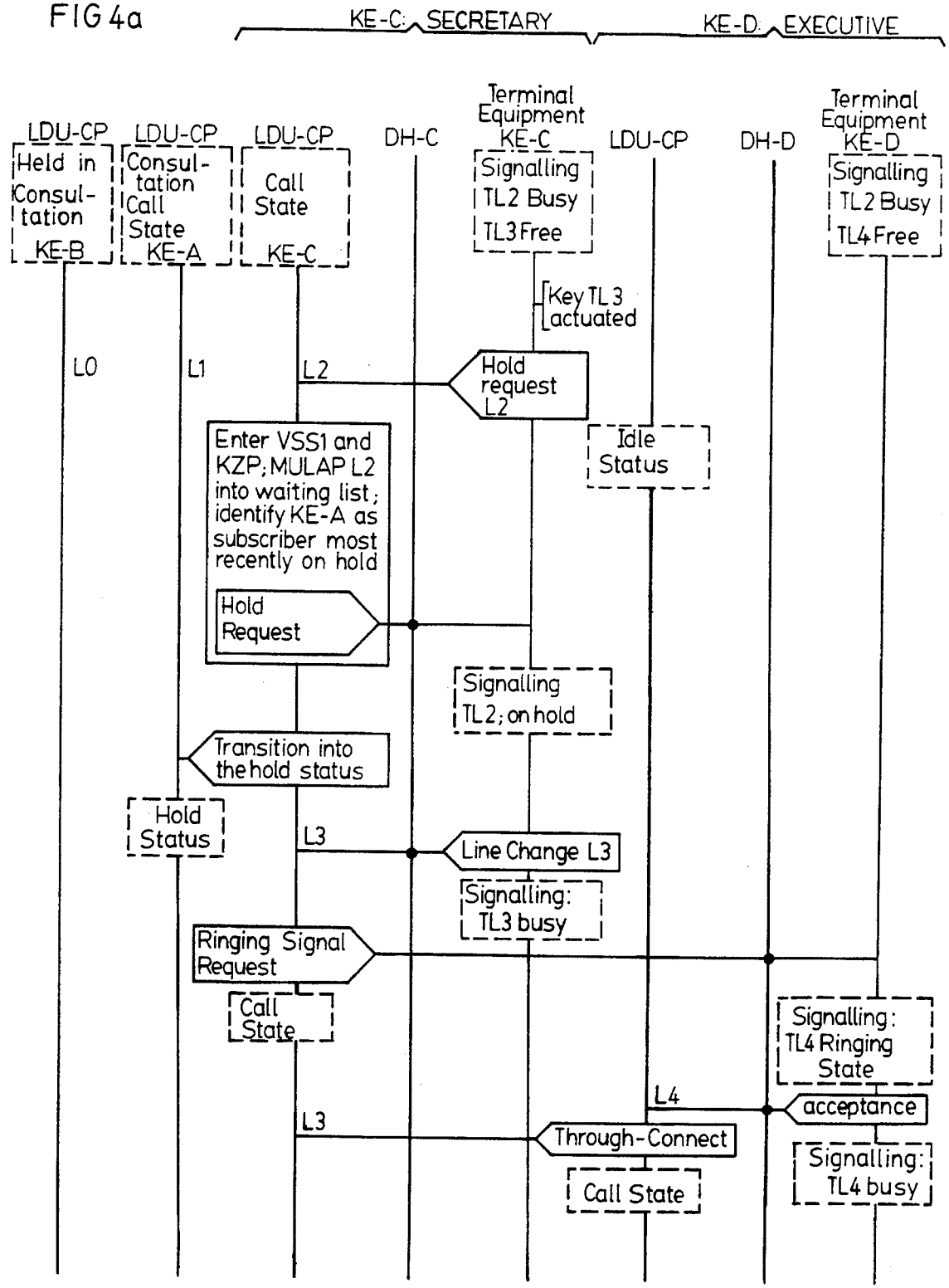

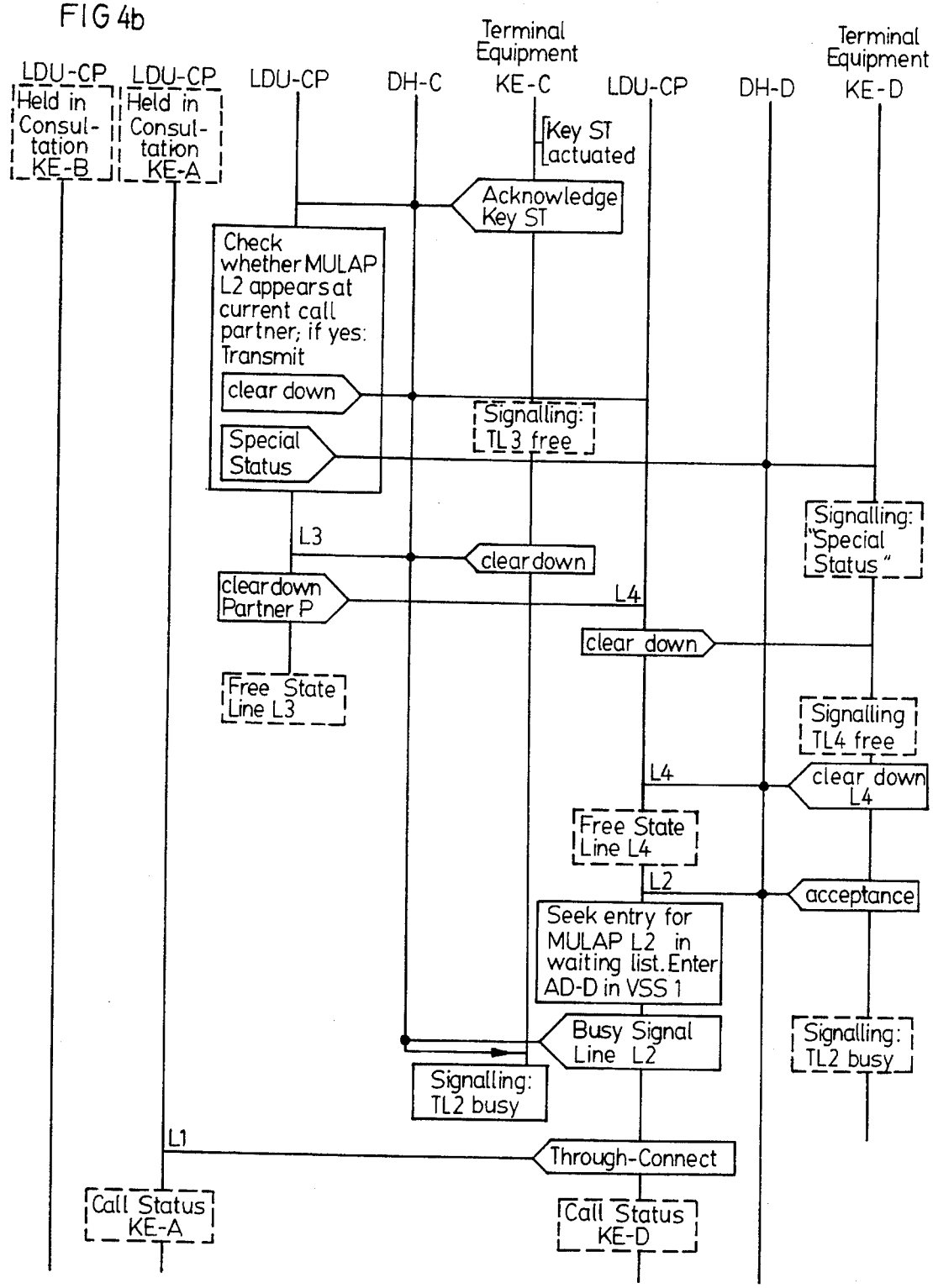

PROGRAM-CONTROLLED COMMUNICATION SYSTEM WHEREBY A CALL REQUEST IS SIMULTANEOUSLY SIGNALED AT A PLURALITY OF COMMUNICATION TERMINAL EQUIPMENT

This is a continuation of application Ser. No. 954,874, filed Sep. 30, 1992 now abandoned.

BACKGROUND OF THE INVENTION

The present invention is directed to a program-controlled communication system to which communication terminal equipment are connected that have line keys and/or function keys with whose actuations switching-oriented procedures and call setup procedures can be initiated. The information initiating and controlling these procedures as well as the key identification information is contained in memory areas of a database respectively allocated to a key which the central system control accesses. Device-related information including, among other thins, information about connection configurations, authorizations and services and information about physical functions such as, for example, the type of interface is stored within the database. At least one group composed of one first communication terminal equipment and one second communication terminal equipment is provided as such a device configuration and an incoming call addressed for the first communication terminal equipment is simultaneously signaled at both the first and second communication terminal equipment, preferably in different ways. Call-associated information can be weitten into and read out from memory sections of a main memory to be dynamically allocated and that serve as call register elements and as what are referred to as waiting list memory elements. The call-associated information is written thereinto and read out therefrom by the central system control both during the call setup as well as for an existing call.

A modern digital, computer-controlled communication switching system is fundamentally composed of a plurality of switching-oriented function units and of a programmable, digital computer system that controls the function units and monitors all switching-oriented operations. To this end, the computer system is informed with information about the operating status of the function units and about status changes, particularly about inputs at the connected terminal equipment. It can therefore immediately produce and output appropriate control instructions and messages as needed.

In addition to being capable of executing the actual switching control, such communication switching systems, particularly telephone private branch exchanges, are also capable of realizing a control or realization of additional control procedures that proceed beyond the actual switching event. Such additional functions are generally referred to as performance features, whereby a great number of different performance features is particularly known for the communication service of "voice". Such performance features can be initiated either when seizing the switching equipment or during a call that already exists. Included, for example, among such performance features are preventing undesired calls, acoustic and/or optical prompts portrayable on an optical display means for waiting subscribers and for the respective operator of a terminal equipment in different switching-oriented statuses, as well as the possibility of a consultation with another subscriber proceeding from an existing call. In such a case, the partner of the original call is switched into a waiting position, whereby this original call can be taken up again after a consultation call.

A special configuration can exist for a plurality of terminal equipment connected to the communication switching system insofar as a call that is intended for a specific terminal equipment of this group is simultaneously signaled at all other terminal equipment belonging to the group. It is accepted with priority at a terminal equipment intended for this purpose (multi-line appearance). For example, such terminal equipment can be allocated to an executive subscriber and to the secretary. Such terminal equipment having a special constellation with respect to one another can also belong to a group of terminal equipment that are equipped with functions as are usually standard for terminal equipment utilized in what are referred to as key telephone systems. This means that the switching-oriented seizure of subscriber lines, the setup of internal connections and the use of performance features occurs in response to key actuation. These functions are realized by programs integrated in the private branch exchange. The information exchange required for this purpose between the terminal equipment and the private branch exchange is possible on the basis of a subscriber signaling procedure in a signaling channel arranged between the system and the terminal equipment. The control of the optical displays that provide information about switching-oriented statuses of one's own terminal equipment and of the other terminal equipment of the group then also occurs on the basis of the signaling information transmitted thereover. All switching-oriented procedures for the terminal equipment of this group initiated by the line keys in the communication terminal equipment are realized in the communication system.

Given a call setup, a memory element of a dynamic memory is respectively allocated and identifiers that identify the terminal equipment participating in such a call are written into this memory element. When, for example, a plurality of such calls are chained in such a way that, for example, terminal equipment that are in a waiting position or in a current connection are to be identified in conjunction with a multiply undertaken consultation, then this requires a corresponding high number of entries in one and the same call register. Given more than three entries related to terminal equipment that, for example, can relate to the identifier for the two terminal equipment participating in a call and can relate to the identifier for a terminal equipment situated on hold, an increased outlay for computer capacity and, necessarily, an increase programming outlay for the control and administration procedures is required for forming the information related to terminal equipment that proceed beyond this and for administering this information. Among other things, these administration procedures have testing routines with which an identification must be made to determine if a status change has occurred in the relationship of the individual devices relative to one another or if a device has disconnected, for example by hanging up.

SUMMARY OF THE INVENTION

It is an object of the present invention to allow the standard traffic possibilities, particularly for at least two terminal equipment having the described, special configuration relative to one another, without using especially complex control procedures.

Proceeding on the basis of the program-controlled communication system set forth above, the object of the present invention is achieved in that (in those cases wherein the incoming call signaled simultaneously at both communication terminal equipment was first accepted by the second communication terminal equipment and was subsequently transferred into a holding condition) a call setup upon utilization of a call register element independent of the call already previously set up is initiated from this terminal equipment to the first-cited communication terminal equipment and the through-connection is effected by the central system control. As a result of actuating a special function key and on the basis of the key identification information thus communicated to the communication system and on the basis of the switching-oriented procedures read out from the allocated memory area of the database in response thereto, the central system control initiates both the cleardown of the connection existing between the first and the second communication terminal equipment and also simultaneously initiates the communication of a special signaling information via the signaling channel to the first communication terminal equipment. A message corresponding to the call acceptance is generated by this special signaling information and, thus, the call setup procedure is initiated and the through-connection of the first communication terminal equipment to the communication terminal equipment placed into the holding condition is effected.

By actuating the inventively provided special function key at the second terminal equipment (secretary subscriber), a connection can be switched between the first terminal equipment (executive subscriber) of the special terminal equipment configuration group composed of the two terminal equipment to the original calling terminal equipment. This is possible without the operating procedures otherwise required having to be implemented. In this special configuration, these terminal equipment can, for example, correspond to executive/secretary stations. The call setup between the first and the second communication terminal equipment necessary in this conjunction can be completely implemented by the actuation of a further function key. This switching of the call in the fashion of an allocation can also occur for different switching-oriented statuses that the originally calling terminal equipment assumes. In an especially advantageous way, it is then also possible when this originally calling terminal equipment has in turn transferred a terminal equipment or a trunk circuit from a previously existing call connection into a waiting position. Thus, the following call is set up proceeding from a consultation call status. After this previously existing connection chain was brought into the hold status by the second terminal equipment of the terminal equipment configuration, the connection can be built-up between this second and the first terminal equipment in the sense of a second consultation without having to expand a call register by a terminal-equipment-related memory location. Instead of a true, second consultation possibility, an alternative possibility is thus inventively provided wherein the outlay for additional programs is minimized. The procedures already implemented for the standard operations can, in particular, be utilized in view of the entries into the call registers, since these can fundamentally be retained unmodified in conjunction for this solution of the present invention alternatively existing for the second consultation.

According to another advantageous development of the present invention, the through-connection of the first communication terminal equipment of the special device configuration primarily relates to the originating communication terminal equipment held by the second communication terminal equipment and secondarily relates to the terminal equipment or trunk line held in turn by this originating communication terminal equipment in those instances wherein the originating communication terminal equipment has transferred into the idle condition. The latter, for example, would be the case when the appertaining subscriber hangs up. The subscriber originally placed on hold himself by this subscriber remains in the connection chain that has been set up. This is defined by the corresponding position in the appertaining call register. As a result of actuating the special function key, the connection of this terminal equipment to the terminal equipment or, respectively, trunk line on hold is then effected by the central system control.

Further advantageous developments of the present invention are as follows.

The call through-connect to the communication terminal equipment or trunk circuit on hold is displayed at the communication terminal equipment of the special device configuration on the basis of a specific optical and/or acoustical signaling that differs from the signaling provided for other switching-oriented statuses of these communication terminal equipment.

Line-seizing keys are provided as needed for the set up of a call between the first and the second communication terminal equipment of the special device configuration and for the set up of a call of these communication terminal equipment to a calling terminal equipment, the actuation of the line-seizing keys effecting the complete call set up. A signaling of the respective line status occurs by optical displays that are preferably respectively integrated in these keys.

When the originating communication terminal equipment of the call accepted by the second communication terminal equipment of the special device configuration was transferred into a special hold status (exclusive hold) that only allows the reassumption of this call by this second communication terminal equipment, the conversion of the special hold status into a normal hold status (common hold) is undertaken by the central system control. It is undertaken on the basis of the call set up that has been undertaken between the first and the second communication terminal equipment, so that the prerequisite for the through-connect of the first communication terminal equipment to the communication terminal equipment placed in the hold status exists as a result thereof.

The system of the present invention has a memory wherein an area to be allocated in call-associated fashion is used as call register and as waiting list memory. The element of the call register accepting call-associated information only has memory locations for the switching status or for the identification information of a maximum of three communication terminal equipment in those instances, wherein the terminal equipment calling the first communication terminal equipment of the special device configuration has in turn transferred a communication terminal equipment with which it had a call connection into the hold status.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a block diagram depicting the logical connection of a special device configuration in conjunction with fundamental circuit components of a digital communication system;

FIG. 2 is a block diagram depicting the basic structure of the controller of such a digital communication system;

FIGS. 4a–4b are diagrams having the message steps related, in particular, to the terminal equipment of the special terminal equipment configuration.

DESCRIPTION OF THE PREFERRED EMBODIMENT

Figure 3A:
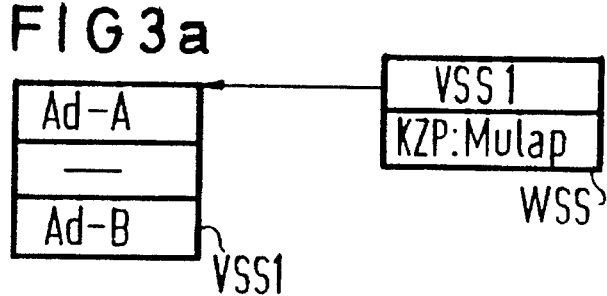
FIGS. 3a–3e depict the structure of the dynamic memories for different switching-oriented statuses of the participating subscribers.

The central component part of the digital communication system schematically shown in FIG. 1 is a switching network SN via which communication terminal equipment, schematically indicated by the terminal equipment KE, KE-A . . . KE-D, are connectable to one another or to lines VL leading to a public switching system or to other private branch exchanges. The central switching network SN is under the control of a central system controller ASt that represents the hierarchically upper most structural level of the communication system. This structural level is formed by a central control processor DP that coordinates the interworking of all components and modules of the communication system. In addition to being equipped with a clock-generating means PG, the system controller is also equipped with a preceding access control DCL and with a memory MEM. The unit DCL serves as an interface to the periphery that, as "master" of a HDLC connection, implements the protocol handling on the signaling channel. For example, the switching-oriented database and all programs relevant in terms of switching technology and the data appertaining thereto are stored in the memory MEM. Thus, critical functions of the central control processor DP, are the storing and request-suited handling of switching-oriented programs and the control and monitoring of the local bus LB. The units DCL and the switching network SN are connected to the latter facing toward the periphery. Additional, standard functions of the central data processor DP are, for example, administration and maintenance executions and reliability-oriented displays.

Peripheral interfaces PS to which an interface control LTUC is allocated are a critical component part of the periphery Pe. This interface control LTUC controls the call setup between the communication terminal equipment KE, whereby a call setup procedure that is realized in program-oriented terms is provided for this purpose. The methods or program modules sequencing the signaling protocols with the communication terminal equipment KE are predominately realized in the interfaces PS. The call set up methods or program modules serving the purpose of authorization checking with respect to services, performance features, etc., as well as the connection control via the digital, central switching network SN are implemented in the central system controller ASt.

In addition to digital communication terminal equipment, traditional terminal equipment having analog transmission can also be respectively connected to the communication system via a subscriber line ASL. This occurs for every peripheral interface PS via a circuit module (not shown) that governs the corresponding, digital information transmission for the digital communication terminal equipment and on the basis of a correspondingly adapted circuit module (which is likewise not shown) for the analog communication terminal equipment. These circuit modules are multiply provided for every interface PS and serve, among other things, the purpose of converting the different signaling information from the individual terminal equipment to a format that is uniformly employed within the communication system. A plurality of line terminations are respectively accessible at every circuit module.

Further communication terminal equipment KE-A . . . KE-D are also indicated in FIG. 1, these being respectively connected via, for example, a two-lead subscriber line in the same way as the communication terminal equipment KE. However, as indicated in the logical connection plan in FIG. 1 within the field for these appertaining devices indicated by the dot-dash boundary a plurality of lines L0 . . . L4 can be defined in terms of software, to which, for example, a line-seizing key with respect thereto is respectively allocated at the terminal equipment. This is symbolically indicated, for example, by the keys TL2 and TL3 or TL2 and TL4 for the communication terminal equipment KE-C and KE-D. These keys can belong to a set of function keys FT with which at least every digital terminal equipment KE-C or KE-D is equipped in addition to being equipped with a push-button set WT. These two terminal equipment KE-C and KE-D, for example, can belong to a group of connected terminal equipment for which functions are realized that are normally allocated to what are referred to as key telephone systems. These are usually referred to as key performance features. What this means, among other things, is that connections can be directly set up by the actuation of line-seizing keys and that the switching statuses of the other terminal equipment belonging to this specific group are signaled at the appertaining terminal equipment. In the exemplary embodiment, the terminal equipment KE-C and KE-D are intended to be executive/secretary subscriber stations. A complete call set up to the respectively other terminal equipment is implemented between these two terminal equipment by actuating the key TL3 at the terminal equipment KE-C or TL4 at the terminal equipment KE-D that, for example, represents the executive terminal equipment. Furthermore, given a call request to the terminal equipment KE-D, this fact should be signaled both at this terminal equipment as well as at the other terminal equipment KE-C having this special configuration with respect to this terminal equipment. This signaling can occur in a different way at each terminal equipment. Thus, for example, the key TL2 allocated to the pseudo line L2 at the terminal equipment KE-D can light up and an acoustic call can additionally occur at the terminal equipment KE-C in addition to the activation of the luminesce display. This pseudo line LE2, consequently, appears at both terminal equipment. This could fundamentally also be the case at further terminal equipment. A call request that, in accord with the assumption, is signaled at all terminal equipment of the group can, in accord with the intent, be taken at a terminal equipment, for example at the terminal equipment KE-C allocated to the secretary subscriber station. The further switching possibilities for the connection chain indicated in FIG. 1 shall be set forth in greater detail in conjunction with the following figures, particularly in conjunction with FIGS. 3 and 4. What the symbols selected in FIG. 1 are intended to indicate is that a connection first existed between the terminal equipment KE-A and the terminal equipment KE-B, this call having been placed into the hold status by the communication terminal equipment subscriber A since he had setup a consultation call to the terminal equipment KE-D via the line L2 that (as already described) appears at both terminal equipment of the terminal equipment constellation. Such a multiply appearing line is referred to as "MULAP" line (multi-line appearance) in the technical field.

The basic control structure shown in FIG. 2 for a digital communication system has two control structure levels, whereof the one serves the purpose of controlling peripheral devices on the basis of device handler program modules DH1, DH2 . . . DHx respectively adapted to a type of communication terminal equipment. Included among these are not only communication terminal equipment KE connected to the periphery but also central, circuit-oriented equipment such as access sets and switching network. The device handler program modules DH1 . . . DHx are fashioned associated to types of communication terminal equipment such that they respectively control the signaling method and the user surface of the corresponding type of communication terminal equipment. Each of these device handler program modules offers a system-uniform interface to the other structural level, namely to the switching technology structural level. This is represented by a program module LDU-CP (logical device unit call processing). The information exchange between the device handler structure level and the switching technology structure level occurs with universally valid, defined messages that are transmitted via a software bus structure SWB. This can be considered an integral component part of the operating system of the central system controller. The functions of the logical device unit call processing LDU-CP, for example, comprise the processes within the entire switching procedure necessary for controlling the call set up and the call clear down. Thus, for example, authorizations are checked, barred code checks are implemented, a signaling of switching-oriented statuses between the communication terminal equipment occurs, and an activation and a deactivation of switching-technology performance features is enabled proceeding from the various switching-oriented statuses. The logical device unit call processing LDU-CP, the device handler program modules DH1, DH2 . . . DHx and the software bus SWB have access to the database DB of the communication system with database access routines DBAR. Further modules are provided in addition to the logical device unit call processing, for example the administration and maintenance program modules AMA. These serve the purpose of sequencing administration and maintenance jobs. The database DB is accessible to at least one part of these, likewise via defined database access routines.

The database DB that, for example, is allocated to the memory MEM of the system controller, contains permanent memories. For example, the system configuration data SK are stored as permanent data in the memory area KD. Upon every initiation of a call set up procedure by a communication terminal equipment, a memory area allocated to the respective equipment is fundamentally interrogated in this customer data memory KD of the database. The calling communication terminal equipment is unambiguously identified within the framework of this interrogation. The services and authorizations with respect to employable performance features which are stored therein are read and, as warranted, are stored in a memory area AS of the database that stores dynamic data. Simultaneously, the physical functions contained therein such as, for example, the terminal equipment interfaces employed are read and stored. This data is evaluated or interrogated during the course of the call set up and upon initiation of switching-oriented procedures. Further, information relating, among other things, to the line-seizing function keys is contained in the permanent memory area KD. The inventively utilized special function key ST also represents a function key, this being present at the terminal equipment KE-C and the significance thereof to be set forth later. For example, the key identification data is stored in the permanent memory area FTI. This switching information from which the switching-oriented procedures to be initiated as a consequence of the key actuation can be derived is contained therein. First, the stored key identification data is compared to data that is formed by the actuation of a function key in the respective communication terminal equipment and which was communicated to the communication system. Thus, as a result of the actuation of such a key at a communication terminal equipment to which what are referred to as key functions are allocated, one's own subscriber line can be directly seized by the communication system; the device can be connected to an exchange line connected to the communication system or a call set up to another, internal communication terminal equipment can be implemented.

The fact that the special executive/secretary terminal equipment configuration KE-C and KE-D is selected via what is referred to as the "MULAP" line L2 is thus entered in the permanent memory area KD provided for terminal-equipment-related information. This stored information then simultaneously yields a reference to the switching-oriented procedures coupled thereto. In this specific case, this means, among other things, that an incoming call is signaled at both terminal equipment (as already mentioned).

The memory area AS is provided in the database DB for dynamic data, whereby this memory area can represent a main memory of the memory arrangement MEM of the system controller ASt. Given every incoming call or given every call set up, a dynamic memory element VSS of a call register VS is allocated to the connection. Further memory elements VSS that serve as what are referred to as waiting list elements of a waiting list memory WS are also utilized in conjunction with the call set up.

In order to minimize the programming outlay for, among other things, the administration of this call and waiting list memory, it is provided that a maximum of only three terminal-equipment-related entries are accepted in the call register. For example, an identifier for the terminal equipment or terminal equipment subscribers currently participating in a call and the identifier of a further subscriber on hold are provided. This identifier can respectively reference a device memory element containing a specific information.

The information respectively written into the memory elements VSS and WSS by the system controller for the call situation between a total of four terminal equipment indicated in FIG. 1 within the field indicated with broken lines are structurally shown in FIGS. 3a through 3d. It is assumed that a connection to subscriber B existed from the terminal equipment KE-A proceeding from the subscriber A. The subscriber A transferred this call into the holding condition. This, for example, can automatically occur when the subscriber A sets up a consultation call to another subscriber proceeding from the call. For example, let this be the subscriber D whose reached via the "MULAP" line L2. The address information Ad-A for the active subscriber A according to FIG. 3a and the address information Ad-B for the subscriber B on hold are entered in the call register element VSS1 allocated to this first call. The fact that the subscriber B is in a hold status is defined by the specific memory location (third memory location) in the call register element.

Figure 3B:
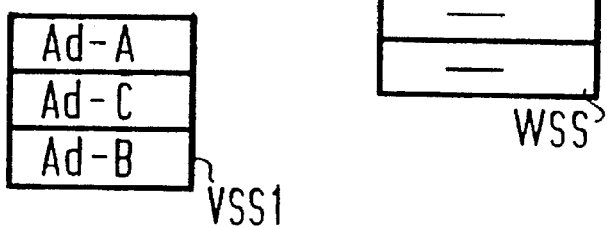

Whenever a calling subscriber attempts to set up a connection to a destination subscriber, information is written into an element WSS of a waiting list memory WS. In this specific instance wherein the subscriber A calls the subscriber D, the address of the call register VSS1 and a code point KZP:MULAP is entered in this element WSS. Such a code point is defined as identifier for every "device" to be selected. Such an identifier is thus defined for every individual terminal equipment, for each and every trunk circuit and for a personal paging means and for what is referred to as the "MULAP" line as well. As already mentioned, this latter "MULAP" line harbors a plurality of subscribers. When the call request of subscriber A that is intended for subscriber D is accepted by the secretary communication terminal equipment C as a consequence of the executive/secretary configuration, then the information according to FIG. 3b is written into the call register element VSS1. The address information Ad-C for the current call partner C is thus entered at the second location. The connection has thus in fact been setup, so that the waiting list information is erased.

The information regarding that call register into which the address information for the subscriber C is to be entered derives on the basis of the entries in the waiting list memory element WSS. The individual waiting list elements are interrogated according to the code point "MULAP". When this code point is found in an element, then the address of the appertaining call register VSS1 wherein the terminal-equipment-related information is already entered or must be entered thus simultaneously derives. In this specific instance, this relates to the entry for the subscriber C, according to FIG. 3b.

Figure 3C:
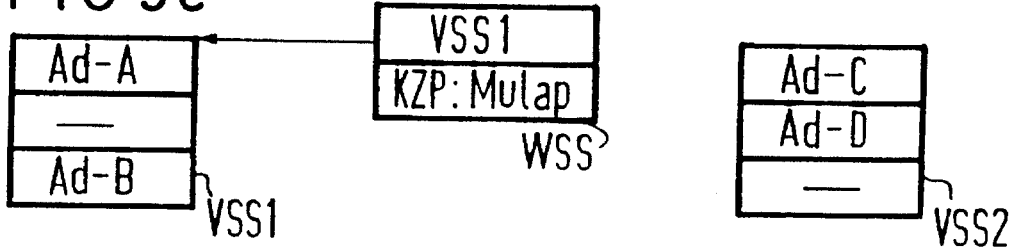

FIG. 3c shows the situation wherein the subscriber C is in a call connection with the subscriber D. The setup of this call, for example, can be undertaken by actuating the key TL3. As a result of the communicated key identification information, the corresponding, switching-oriented information is read from the permanent memory KD of the database and the call is set up. The current call partners C and D are entered in a separate call register VSS2. The call register VSS1 comprises the entries for the call that were just obtained and that formed the starting point for this connection chain. According to the assumption, the subscriber A was transferred into the waiting condition with the call set up between the subscribers C and D ensuing on the basis of the line change onto the line L3. The entries contained in the call register element VSS1 thus relate only to subscribers on hold. In order to document this, the waiting list memory element WSS1 assumes a specific position within the overall waiting list memory area. It is then part, namely, of a memory section wherein only information that relate to calls on hold is stored. This connection with the subscriber A most recently put on hold by the subscriber C can be reutilized on the basis of the entries in the waiting list memory element WSS1. When its own code point is found when searching the individual waiting list elements, then the call register element VSS1 responsible for a desired reassumption of the original call can be taken therefrom, again on the basis of the corresponding address entry in the appertaining waiting list memory element. The references about the original call were, so to speak, introduced into a waiting list.

Figure 3D:
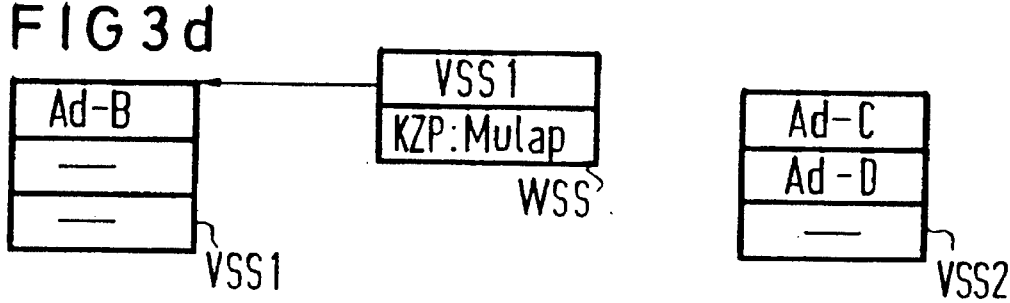

FIG. 3d shows the situation wherein the subscriber C speaks with the subscriber D on the other "pseudo line" L3–L4 in the same way as in FIG. 3c, whereby, however, it is assumed that the subscriber A has hung up and was thus cleared down. Only the subscriber B is thus still stored in terms of address, for example, by the address of the appertaining device memory element, in the call register element VSS1 as partner to be switched.

It is now assumed that the subscriber C actuates the specific special function key ST proceeding from the situation illustrated in FIG. 3c. The operations or messages shown in FIG. 4 are then initiated with the actuation of this specific key. These then lead thereto in the terminal equipment that the subscriber D, for example, an executive subscriber, is through-connected to the subscriber A most recently on hold without undertaking any activities whatsoever. This automatic call set up thus occurs on the basis of the allocation of the subscriber most recently on hold, subscriber A in this specific case. What is thus ultimately achieved by this allocation is a situation as could also be achieved via a true, so-called second consultation. This true, second consultation that would have required an expansion of the call register element by at least one location is thus inventively replaced by the alternative solution. Although this leads to the same final result, the basic functions that have already been implemented can be retained in the handling of the call register entries. Although a total of four terminal equipment participate in the described chain of individual connections, the call register elements accept information that is related to at most three terminal equipment. For example, these relate to the information about two terminal equipment residing in a current call connection as well as information about a subscriber on hold. The procedures already implemented for the write-in and for the administration of these entries that also take changing switching-oriented statuses of these terminal equipment into consideration can thus be employed.

The actuation of the special function key ST by the subscriber C initiates the erasure of the entries in the call register element VSS2. What is effected by the controller is that a search for the corresponding entry is made in the waiting list memory WS with the code point KSP:MULAP employed as identifier of the subscriber C (secretary terminal equipment) or with the code point KZP:MULAP employed as identifier for the "MULAP" line L2. When the entry coinciding therewith is found, then the address of the call register element VSS1 that is to be utilized for the connection to be set up is thus simultaneously known. As shown in FIG. 3c, the address information Ad-O for the terminal equipment KE-D of the subscriber D is entered in this call register element. The waiting list element WSS is simultaneously erased. The central switching network SN is subsequently initiated to set up the call between the terminal equipment KE-D and the terminal equipment KE-A of the subscriber A on hold.

FIGS. 4a and 4b show the messages that are generated in the switching-oriented structure level LDU-CP with reference to the terminal equipment, particularly to the terminal equipment KE-C and KE-D, the switching-oriented statuses of the individual terminal equipment being also defined. Further, the signalings undertaken at the terminal equipment KE-C and KE-D and the messages generated in these terminal equipment and communicated to the switching-oriented structure level are shown.

It is first assumed in FIG. 4a that a subscriber A had a call connection to a subscriber B. In conjunction with a consultation of the subscriber A, the subscriber B was transferred into a hold status. In consultation, the subscriber A selects the "MULAP" line L2 which (as already explained) appears at the terminal equipment KE-C and at the terminal equipment KE-D. For example, these two terminal equipment can have an executive/secretary configuration relative to one another. It is also assumed that the consultation call was accepted by the terminal equipment KE-C. The line L2 is thus seized at this terminal equipment and the line L3 is signaled as being free. At the terminal equipment KE-D, the line L2 is signaled as busy and the line L4 is signaled as free.

This terminal equipment is in the quiescent or idle condition. The key TL3 allocated to the line L3 is then actuated during the call status between the subscriber C and the subscriber A. A message is derived therefrom that causes the logical device unit call processing to switch the line L2, i.e. the subscriber A, into the hold status. The chaining of the call register VSS1 (FIG. 3) and of the "MULAP" line L2 into the waiting list memory element VSS1 as well as the identification of the subscriber A as the subscriber most recently on hold are undertaken. The switching technology generates a hold request. In response thereto, the line L2 is signaled as line on hold at the terminal equipment KE-C and a message ensues that effects the transfer into the hold status for the subscriber A. The request formed in the terminal equipment KE-C for the line change to the "software" line L3 enabling the connection to the subscriber D then leads—upon involvement of the device handler program module DH-C—to the call set up attempt via the "line" L3 provided for the intercommunication between subscriber C and subscriber D. A selection information for the call request to the subscriber D can be automatically generated on the basis of a corresponding characterization in the permanent memory KD. The line L3 taking on material form at the terminal equipment KE-C in the form of a line key TL3 is identified as busy. The request for the connection of the ringing signals for the terminal equipment KE-D ensues from the switching-oriented structure level. The signaling with respect to the "line" L4 is modified such at this terminal equipment that the call status is indicated. As a result of the message which has ensued in the terminal equipment regarding the call acceptance, this being conducted to the switching-oriented module via the device handler program module DH-D, a message ensues that results in the through-connection of the call between L3 and L4. A connection thus exists between the terminal equipment KE-C and KE-D. L4 is signaled at the terminal equipment KE-D as being busy. The message "through-connect" simultaneously effects that the ringing tone previously applied is disconnected for the terminal equipment KE-C.

In case this generation of the hold request was defined as a specific holder request in such a way that only that subscriber who has transferred the call partner into the hold status can again take up this connection, then this specific status must be modified insofar as a normal hold status is generated. A later allocation of the subscriber on hold to the terminal equipment KE-D is only possible in such a case.

FIG. 4b shows the messages and signaling statuses or line statuses that are started as a result of the actuation of the special function key ST at the terminal key KE-C, i.e., for example, at the secretary device, ensuing during the call status between the subscriber C and the subscriber D. The actuation of this special function key ST is communicated to the switching technology structure level via the device handler structural level. In response thereto, it is found on the basis of a check that the "MULAP" line appears at the terminal equipment of the current call partner D. In response thereto, a message "cleardown" is communicated to the device handler program module DH-C and a message "special status L2" is communicated to the device handler program module DH-D and forwarded to the respective terminal equipment. An adaptation of the individual messages to the message format provided for the terminal equipment is then potentially undertaken in the respectively appertaining device handler program module. Such an adaptation also ensues for messages that are to be communicated from a terminal equipment to the switching-oriented structure level.

Figure 3E:
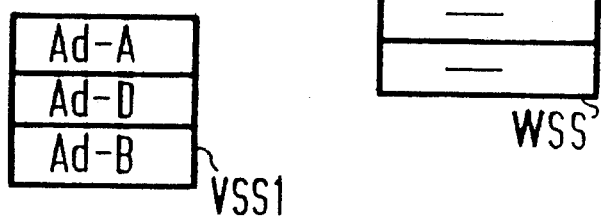

A cleardown operation for the call existing between the terminal equipment KE-C and KE-D is initiated with the message "cleardown". The device handler structure level is thereby informed by the message "cleardown" in the opposite direction that the respective terminal equipment has cleared down. This message can also be used to disconnect connecting paths and tones. After the cleardown operations, the free status for the "pseudo lines" L3 and L4 is achieved and this fact is signaled to the terminal equipment KE-C and KE-D. The line L3 or the line L4 is thus identified as "free". In addition to these cleardown operations, a message is simultaneously generated as a consequence of the communicated, specific message "special status L2" this message, as "acceptance" message, corresponding to that message that is generated given a call acceptance. This ensues on the basis of the special status in which the "MULAP" line resides at the terminal equipment KE-D and that was communicated to the terminal equipment as the message "special status L2". When the message "cleardown partner D" arrives in this special status, the current connection L3, L4 is in fact cleared down, but the "acceptance message" with respect to the line L2 is simultaneously generated. The line L2 is signaled as busy at the terminal equipment KE-D. As a result of the "acceptance message", the waiting list memory is searched by the controller for such an entry with the code point for the terminal equipment KE-D which coincides with the identifier for the "MULAP" line in terms of its identifier. When it is found in the section provided in the waiting list memory for connections on hold, then the address of the call register that is likewise contained therein and in which the subscribers A and B on hold via the appertaining call register element are entered is thus also known (FIG. 3). The address information of the terminal equipment KE-D is then additionally stored in this memory (FIG. 3e). The switching-oriented program module LDU-CP generates a message "through connect". The connection between the terminal equipment KE-D and the terminal equipment KE-A on hold is then produced with the assistance of the affected device handler program module. The subscribers A and D are thus in a call status. The actuation of the special function key ST (whose effect is to be described as that of an allocation key), thus switches the call between the terminal equipment KE-D and the subscriber A on hold given a slight expansion with specific program parts that essentially relate to the generation of the acceptance message. If this subscriber should happen to have hung up, then this switching (as already set forth) occurs to the subscriber B whose likewise on hold. When the original call proceeding from which the subscriber A undertook a consultation to the subscriber C was an external connection, then the trunk circuit utilized for this external call is kept on hold instead of the internal subscriber B.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed:

1. A program-controlled communication system having communication terminal equipment, comprising:

a central control having a main memory containing a database, said central control operatively connected to said communication terminal equipment;

the terminal equipment having keys and/or function keys actuation of which initiate switching-oriented procedures and call setup procedures;

first information for initiating and controlling the procedures;

the database having function key identification information contained in memory areas of the database respectively allocated to said function keys which the central system control accesses, device-related information having at least information about connection configurations, authorizations and services, and second information about physical functions;

at least one group composed of one first communication terminal equipment and one second communication terminal equipment provided as a device configuration;

means for simultaneously signaling an incoming first call, from a third communication terminal and addressed to the first communication terminal equipment, at both the first and second communication terminal equipment;

the central system control having means for call-associated information being written into and read out from memory sections of the main memory dynamically allocated and serving as call register elements and as waiting list memory elements, both during a call setup as well as given an existing call;

in instances wherein the incoming first call signaled at the first and second communication terminal equipment is first accepted by the second terminal equipment and is subsequently transferred into a holding status and wherein a call set up for a second call is effected from the second communication terminal equipment to the first communication terminal equipment using a call register element independent of the first call, the central system control having means for clearing down the second call existing between the first and the second communication terminal equipment as well as, simultaneously, initiating communication of signaling information via a signaling channel to the first communication terminal equipment in response to actuation of a predetermined function key and on the basis of function key identification information allocated to said predetermined function key and communicated to the communication system and on the basis of switching-oriented procedures read out in response thereto from the allocated memory area of the database; and means for automatically generating in response to said signaling information, a message corresponding to call acceptance and initiating a call set up procedure and effecting a through-connect of the first communication terminal equipment to the third communication terminal equipment transferred into the hold status.

2. The program-controlled communication system according to claim 1, wherein the first call, that is accepted by the second communication terminal equipment, is set up from the third communication terminal equipment as a consultation call; wherein a partner fourth communication terminal equipment, given one of an originally existing, internal call or a trunk line for an originally existing, external call is first transferred into a hold status by the third communication terminal equipment.

3. The program-controlled communication system according to claim 2, wherein the first communication terminal equipment is primarily through-connected to the third communication terminal equipment placed on hold by the second communication terminal equipment, and wherein said said first communication terminal equipment is through-connected to the fourth communication terminal equipment when the third communication terminal equipment has transferred into an idle mode.

4. The program-controlled communication system according to claim 1, wherein a call through-connect to a communication terminal equipment or trunk circuit on hold is displayed at the first and second communication terminal equipment by means of a specific optical and/or acoustical signaling that differs from signaling provided for other switching-oriented statuses of said first and second communication terminal equipment.

5. The program-controlled communication system according to claim 1, wherein said first communication terminal equipment has line-seizing keys for the set up of a call between the first and the second communication terminal equipment and for the set up of a call of said first and second communication terminal equipment to a calling communication terminal equipment, actuation of said line-seizing keys effecting a complete call set up; wherein a signaling of a respective line status occurs by optical displays that are respectively integrated in said keys.

6. The program-controlled communication system according to claim 1, wherein when the third communication terminal equipment of the first call accepted by the second communication terminal equipment is transferred into a special hold status that only allows the reassumption of this call by said second communication terminal equipment, the conversion of said special hold status into a normal hold status, that allows reassumption of a call by either of the first and second communication terminal equipment, is undertaken by the central system control on the basis of the call set up that has been undertaken between the first and the second communication terminal equipment, a prerequisite being that the first communication terminal equipment is first through-connected to the third communication terminal equipment.

7. The program-controlled communication system according to claim 1, wherein said system further comprises a memory having an area allocated in call-associated fashion that is used as a call register and as a waiting list memory, wherein the call register has a memory element for accepting call-associated information that only has memory locations for switching status or for identification information of a maximum of three communication terminal equipment wherein the second communication terminal equipment calling the first communication terminal equipment has in turn transferred into hold status communication terminal equipment with which the second communication terminal equipment had a call connection.

8. The program-controlled communication system according to claim 1, wherein said device-related information further comprises type of interface.

9. The program-controlled communication system according to claim 1, wherein the incoming first call addressed to the first communication terminal equipment is signaled differently for each of the first and second communication terminal equipment.

10. A program-controlled communication system having communication terminal equipment, comprising:

a central control having a main memory containing a database, said central control operatively connected to said communication terminal equipment;

the terminal equipment having key means for initiating switching-oriented procedures and call setup procedures;

first information for initiating and controlling the procedures;

the data base having function key identification information contained in memory areas of the database respectively allocated to said function key which the central system control accesses, device-related information having at least information about connection configurations, authorizations and services and second information about physical functions;

at least one group composed of one first communication terminal equipment and one second communication terminal equipment provided as a device configuration;

means for simultaneously signaling an incoming first call, from a third communication terminal and addressed to the first communication terminal equipment, at both the first and second communication terminal equipment;

the central system control having means for call-associated information being written into and read out from memory sections of the main memory dynamically allocated and serving as call register elements and as waiting list memory elements, both during a call setup as well as given an existing call;

in instances wherein the incoming first call signaled at the first and second communication terminal equipment is first accepted by the second terminal equipment and is subsequently transferred into a holding status and wherein a call set up for a second call is effected from the second communication terminal equipment to the first communication terminal equipment using a call register element independent of the first call, the central system control having means for clearing down (disconnecting) the second call existing between the first and the second communication terminal equipment as well as, simultaneously, initiating communication of signaling information via a signaling channel to the first communication terminal equipment in response to actuation of a predetermined function key and on the basis of function key identification information allocated to said predetermined function key and communicated to the communication system and on the basis of switching-oriented procedures read out in response thereto from the allocated memory area of the database; and means for automatically generating in response to said signaling information, a message corresponding to call acceptance and initiating a call set up procedure and effecting a through-connect of the first communication terminal equipment to the third communication terminal equipment transferred into the hold status;

the first call, that is accepted by the second communication terminal equipment being set up from the third communication terminal equipment as a consultation call; and a partner fourth communication terminal equipment, given one of an originally existing, internal call or a trunk line for an originally existing, external call being first transferred into a hold status by the third communication terminal equipment.

11. The program-controlled communication system according to claim 10, wherein a call through-connect to a communication terminal equipment or trunk circuit on hold is displayed at the first and second communication terminal equipment by means of a specific optical and/or acoustical signaling that differs from signaling provided for other switching-oriented statuses of said first and second communication terminal equipment.

12. The program-controlled communication system according to claim 10, wherein said first communication terminal equipment has line-seizing keys for the set up of a call between the first and the second communication terminal equipment and for the set up of a call of said first and second communication terminal equipment to a calling communication terminal equipment, actuation of said line-seizing keys effecting a complete call set up; wherein a signaling of a respective line status occurs by optical displays that are respectively integrated in said keys.

13. The program-controlled communication system according to claim 10, wherein when the third communication terminal equipment of the first call accepted by the second communication terminal equipment is transferred into a special hold status that only allows the reassumption of this call by said second communication terminal equipment, the conversion of said special hold status into a normal hold status, that allows reassumption of a call by either of the first and second communication terminal equipment, is undertaken by the central system control on the basis of the call set up that has been undertaken between the first and the second communication terminal equipment, a prerequisite being that the first communication terminal equipment is first through-connected to the third communication terminal equipment.

14. The program-controlled communication system according to claim 10, wherein said system further comprises a memory having an area allocated in call-associated fashion that is used as a call register and as a waiting list memory, wherein the call register has a memory element for accepting call-associated information that only has memory locations for switching status or for identification information of a maximum of three communication terminal equipment wherein the second communication terminal equipment calling the first communication terminal equipment has in turn transferred into hold status communication terminal equipment with which the second communication terminal equipment had a call connection.

15. A program-controlled communication system having communication terminal equipment, comprising:

a central control having a main memory containing a database, said central control operatively connected to said communication terminal equipment;

the terminal equipment having keys and/or function keys actuation of which initiate switching-oriented procedures and call setup procedures;

first information for initiating and controlling the procedures;

the database having function key identification information contained in memory areas of the database respectively allocated to said function keys which the central system control accesses, device-related information having at least information about connection configurations, authorizations and services, and second information about physical functions;

at least one group composed of one first communication terminal equipment and one second communication terminal equipment provided as a device configuration;

means for simultaneously signaling an incoming first call, from a third communication terminal and addressed to the first communication terminal equipment, at both the first and second communication terminal equipment;

the central system control having means for call-associated information being written into and read out from memory sections of the main memory dynamically allocated and serving as call register elements and as waiting list memory elements, both during a call setup as well as given an existing call;

in instances wherein the incoming first call signaled at the first and second communication terminal equipment is first accepted by the second terminal equipment and is subsequently transferred into a holding status and wherein a call set up for a second call is effected from the second communication terminal equipment to the first communication terminal equipment using a call register element independent of the first call, the central system control having means for clearing down (disconnecting) the second call existing between the first and the second communication terminal equipment as well as, simultaneously, initiating communication of signaling information via a signaling channel to the first communication terminal equipment in response to actuation of a predetermined function key and on the basis of function key identification information allocated to said predetermined function key and communicated to the communication system and on the basis of switching-oriented procedures read out in response thereto from the allocated memory area of the database;

means for automatically generating in response to said signaling information a message corresponding to call acceptance and initiating a call set up procedure and effecting a through-connect of the first communication terminal equipment to the third communication terminal equipment transferred into the hold status;

the first call, that is accepted by the second communication terminal equipment being set up from the third communication terminal equipment as a consultation call;

a partner fourth communication terminal equipment, given one of an originally existing, internal call or a trunk line for an originally existing, external call being first transferred into a hold status by the third communication terminal equipment;

the first communication terminal equipment of the special device configuration being primarily through-connected to the third communication terminal equipment placed on hold by the second communication terminal equipment, and said first communication terminal equipment being through-connected to the fourth communication terminal equipment when the third communication terminal equipment has transferred into an idle mode;

said first communication terminal equipment having line-seizing keys for the set up of the call, actuation of said line-seizing keys effecting the complete call set up, and a signaling of a respective line status occurring by optical displays that are respectively integrated in said line-seizing keys;

a memory having an area allocated in call-associated fashion that is a call register and a waiting list memory, the call register having a memory element for accepting call-associated information that only has memory locations for switching status or for identification information of a maximum of three communication terminal equipment wherein the second communication terminal equipment calling the first communication terminal equipment has in turn transferred into hold status communication terminal equipment with which the second communication terminal equipment had a call connection.

16. The program-controlled communication system according to claim 15, wherein a call through-connect to a communication terminal equipment or trunk circuit on hold is displayed at the first and second communication terminal equipment by means of a specific optical and/or acoustical signaling that differs from signaling provided for other switching-oriented statuses of said first and second communication terminal equipment.

17. The program-controlled communication system according to claim 15, wherein when the third communication terminal equipment of the first call accepted by the second communication terminal equipment is transferred into a special hold status that only allows the reassumption of this call by said second communication terminal equipment, the conversion of said special hold status into a normal hold status, that allows reassumption of a call by either of the first and second communication terminal equipment, is undertaken by the central system control on the basis of the call set up that has been undertaken between the first and the second communication terminal equipment, a prerequisite being that the first communication terminal equipment is first through-connected to the third communication terminal equipment.

\* \* \* \* \*